(12) United States Patent
Roberge

(10) Patent No.: US 10,837,403 B2
(45) Date of Patent: Nov. 17, 2020

(54) EXHAUST NOZZLE CONTROL INCLUDING TAPERED CONTROL EFFECTOR FOR A GAS TURBINE ENGINE

(71) Applicant: United Technologies Corporation, Farmington, CT (US)

(72) Inventor: Gary D. Roberge, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 442 days.

(21) Appl. No.: 15/966,041

(22) Filed: Apr. 30, 2018

(65) Prior Publication Data

US 2018/0291837 A1    Oct. 11, 2018

Related U.S. Application Data

(63) Continuation of application No. 14/753,637, filed on Jun. 29, 2015, now Pat. No. 9,964,069.

(51) Int. Cl.
*F02K 1/06* (2006.01)
*F02K 1/00* (2006.01)
(Continued)

(52) U.S. Cl.
CPC ............. *F02K 1/06* (2013.01); *F02K 1/002* (2013.01); *F02K 1/15* (2013.01); *F02K 3/02* (2013.01)

(58) Field of Classification Search
CPC ... F02K 3/02; F02K 1/085; F02K 1/09; F02K 1/605; F02K 1/625; F02K 1/72; F02K 1/56; F02K 1/566; F02K 1/563; F02K 1/58; F02K 1/60; F02K 1/62; F02K 1/64; F02K 1/645; F02K 1/66; F02K 1/68; F02K 1/70; F02K 1/74; F02K 9/86; F02K 1/06; F02K 1/42; F02K 1/1246; F02K 1/78;
(Continued)

(56) References Cited

U.S. PATENT DOCUMENTS 2,669,834 A    2/1954  Helms
3,040,523 A *  6/1962  Price ..................... F02K 1/06
                                                239/265.25
(Continued)

FOREIGN PATENT DOCUMENTS

EP    0298010    1/1989
EP    2369163    9/2011
GB    2159476    12/1985

OTHER PUBLICATIONS

European Search Report for European Patent Application No. 16176954 completed Nov. 17, 2016.

*Primary Examiner* — Craig Kim
*Assistant Examiner* — Stephanie Cheng
(74) *Attorney, Agent, or Firm* — Carlson, Gaskey & Olds, P.C.

(57) ABSTRACT

An exhaust nozzle for a gas turbine engine according to an example of the present disclosure includes, among other things, a duct having a first surface and a second surface extending about a duct axis to define an exhaust flow path, and at least one effector positioned along the first surface. The at least one effector is pivotable about an effector axis to vary a throat area of the exhaust flow path. The at least one effector tapers along the effector axis. A method of exhaust control for a gas turbine engine is also disclosed.

22 Claims, 9 Drawing Sheets

(51) Int. Cl.
*F02K 1/15* (2006.01)
*F02K 3/02* (2006.01)

(58) Field of Classification Search
CPC . F02K 1/004; F02K 1/006; F02K 1/10; F02K 1/08
USPC ............ 60/230; 239/265.19, 265.29, 265.33, 239/265.37, 265.41, 265.43
See application file for complete search history.

(56) References Cited

U.S. PATENT DOCUMENTS

| | | |
|---|---|---|
| 3,113,428 A | 12/1963 | Colley et al. |
| 3,373,940 A | 3/1968 | Loprete |
| 4,037,405 A * | 7/1977 | Huenniger ............ F02K 1/006 60/229 |
| 4,527,388 A | 7/1985 | Wallace |
| 4,575,006 A | 3/1986 | Madden |
| 4,690,329 A | 9/1987 | Madden |
| 4,836,451 A | 6/1989 | Herrick et al. |
| 4,848,664 A | 7/1989 | Thayer |
| 4,978,071 A | 12/1990 | MacLean et al. |
| 5,261,604 A | 11/1993 | Meyer |
| 5,294,055 A | 3/1994 | Garrett et al. |
| 5,524,827 A | 6/1996 | Znamensky |
| 5,687,907 A | 11/1997 | Holden |
| 5,694,766 A * | 12/1997 | Smereczniak .......... F02K 1/002 239/265.17 |
| 5,706,650 A | 1/1998 | Thayer |
| 5,956,939 A | 9/1999 | Fage |
| 6,357,672 B1 | 3/2002 | Cowan et al. |
| 7,096,662 B2 | 8/2006 | Wehner |
| 7,475,548 B2 | 1/2009 | Toffan et al. |
| 8,020,367 B2 | 8/2011 | Toffan et al. |
| 8,096,104 B2 | 1/2012 | Gilbert |
| 2008/0016873 A1 | 1/2008 | Harefors |

* cited by examiner

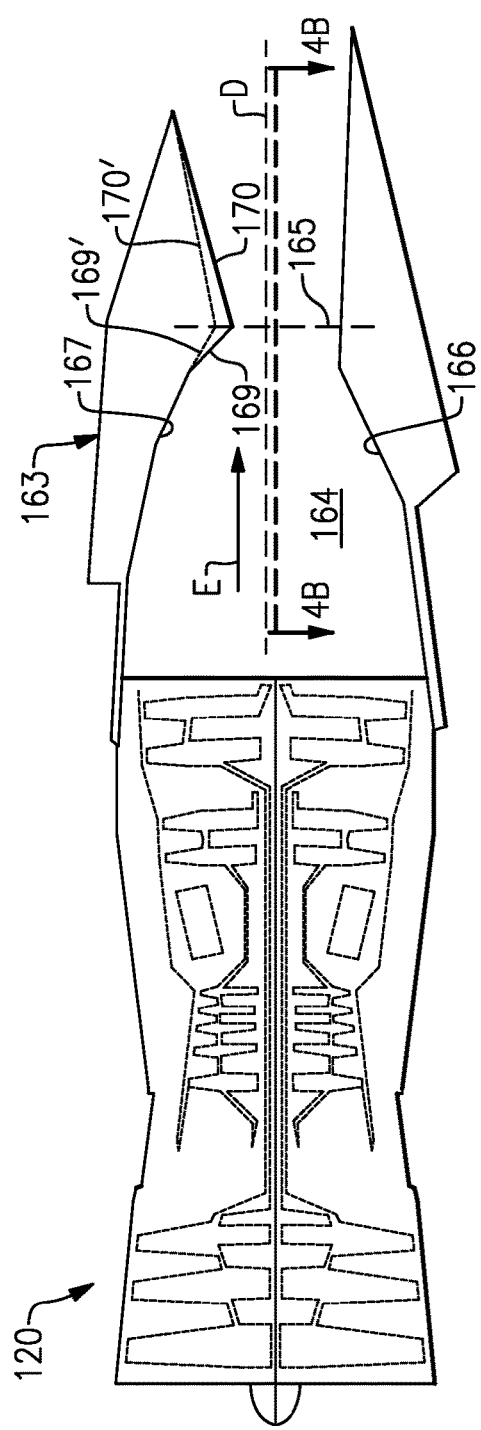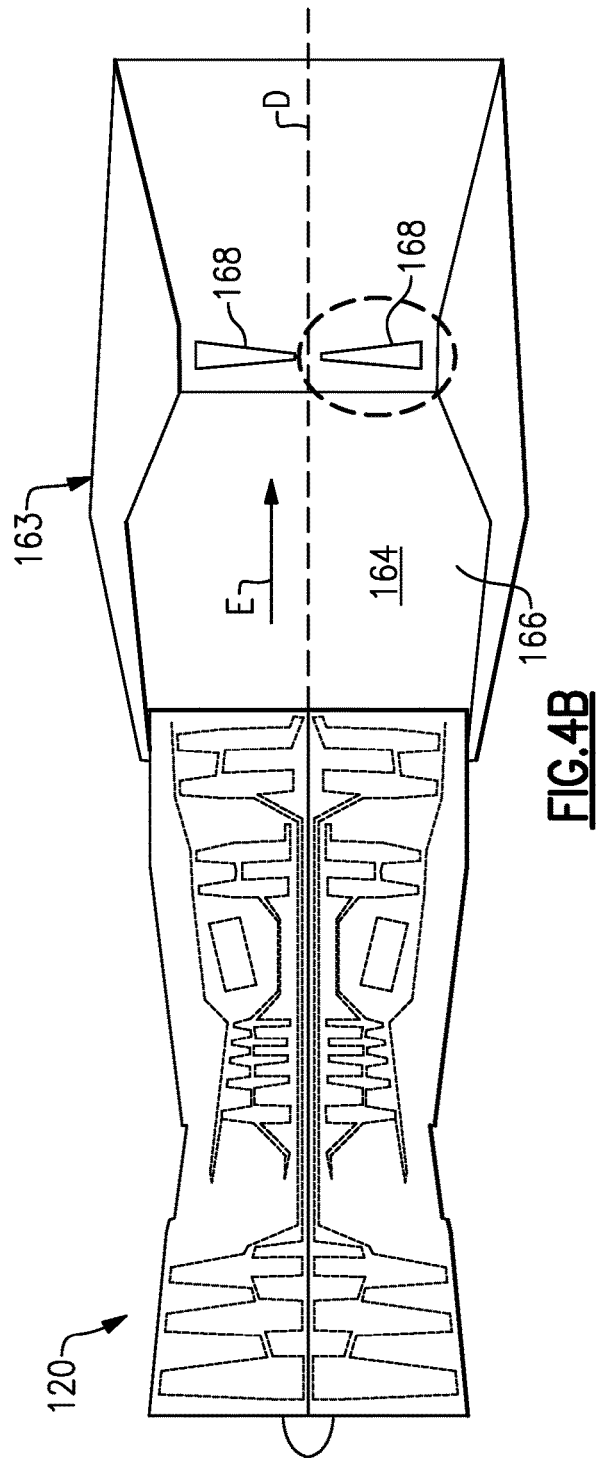

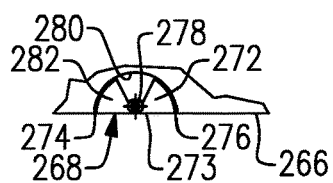
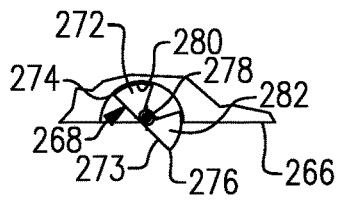
FIG.5B        FIG.5E
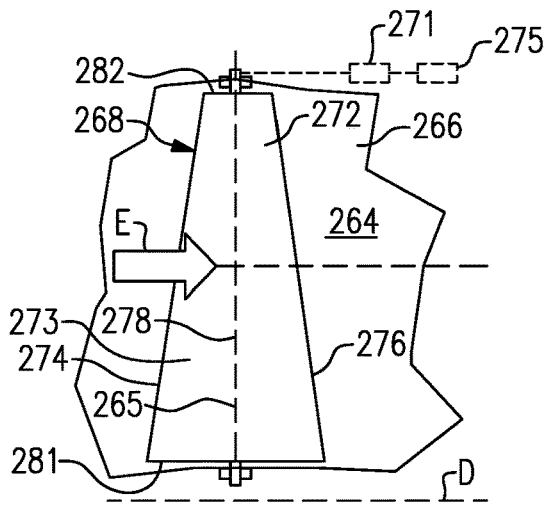
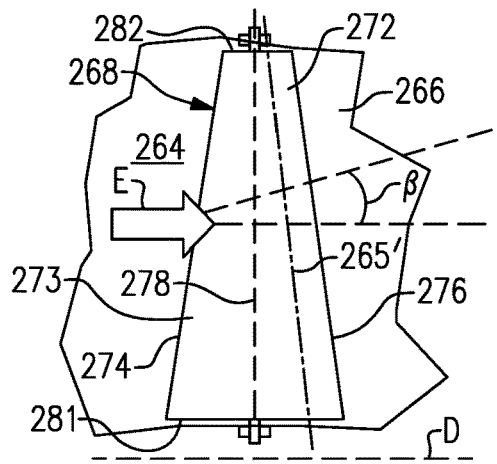
FIG.5A        FIG.5D
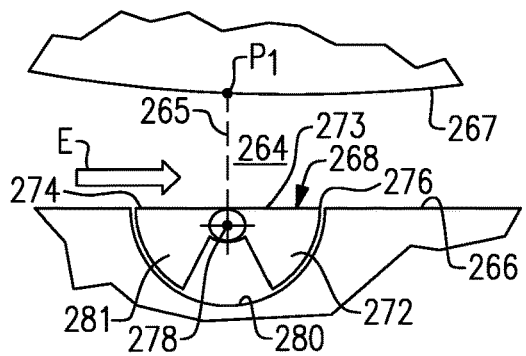
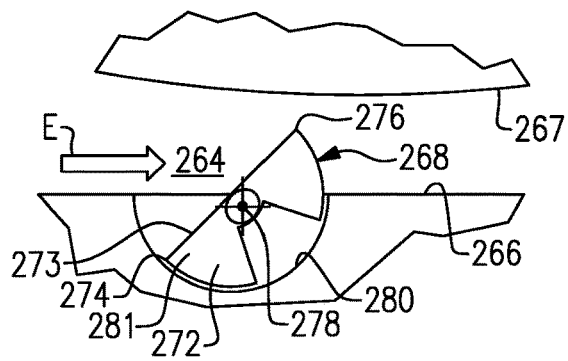
FIG.5C        FIG.5F
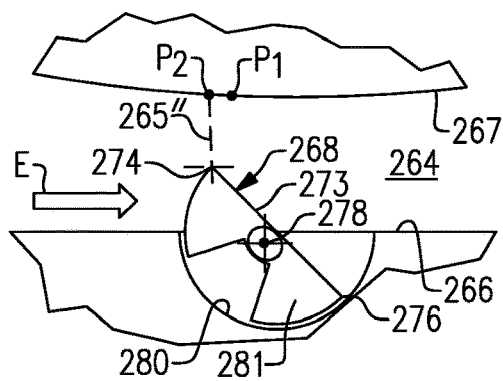
FIG.5G

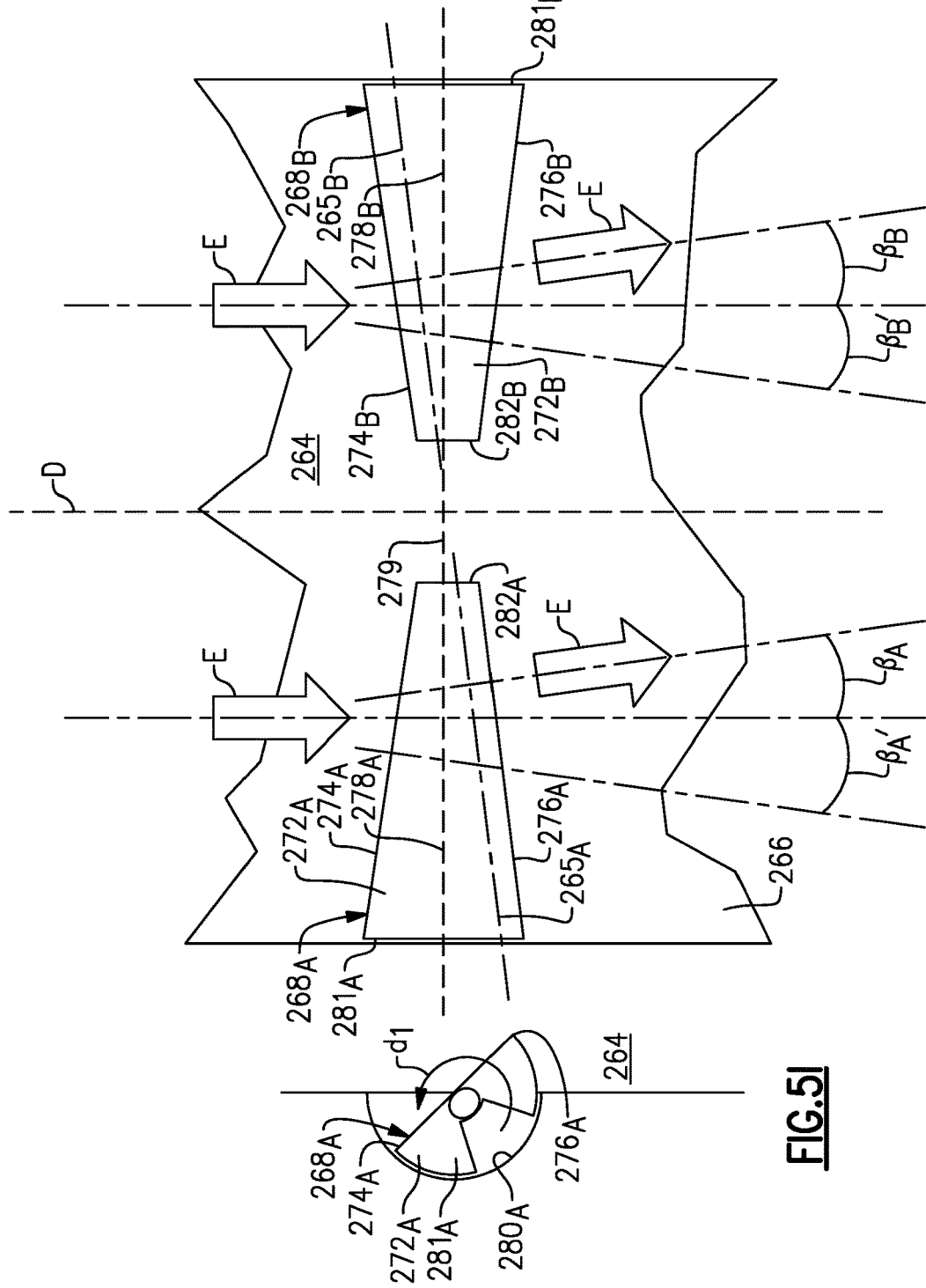

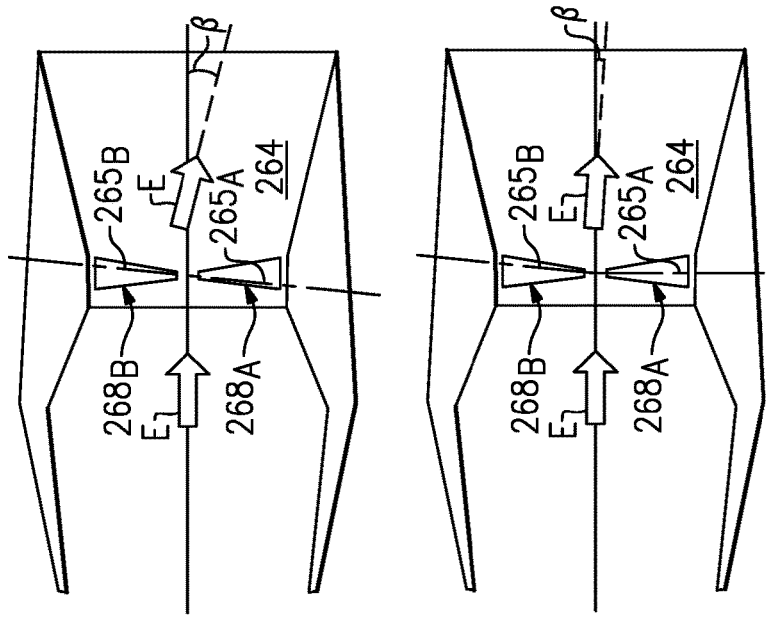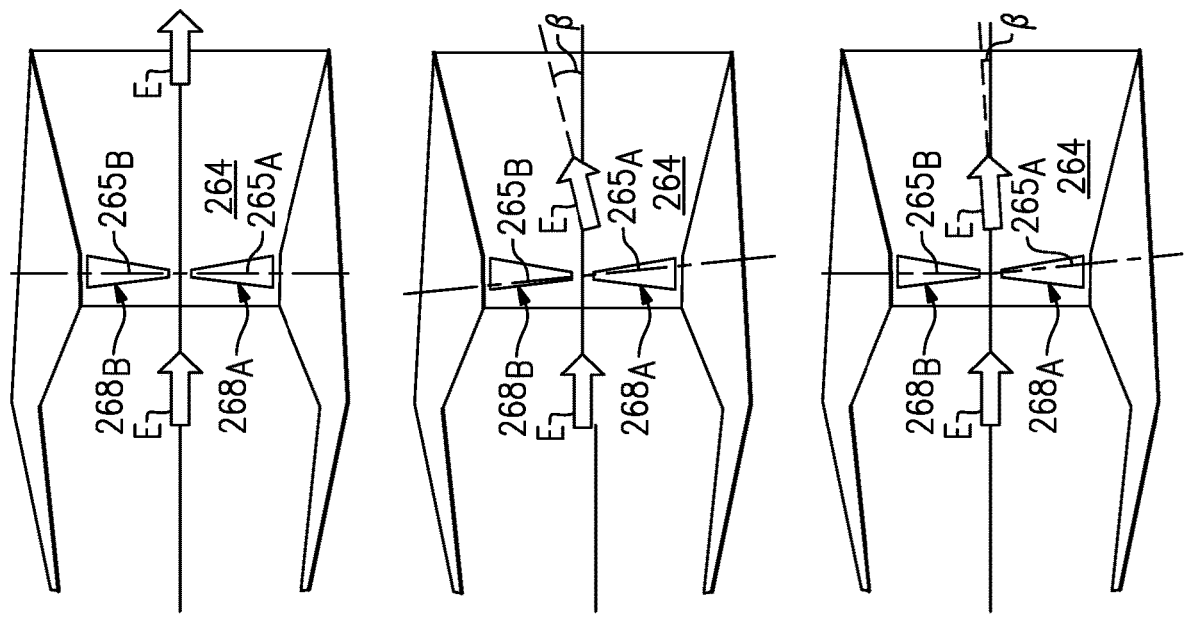

1

EXHAUST NOZZLE CONTROL INCLUDING TAPERED CONTROL EFFECTOR FOR A GAS TURBINE ENGINE

CROSS REFERENCE TO RELATED APPLICATIONS

The present disclosure is a continuation of U.S. patent application Ser. No. 14/753,637, filed Jun. 29, 2015.

BACKGROUND

This disclosure relates to an exhaust nozzle for a gas turbine engine, and more particularly to control of exhaust flow from a gas turbine engine.

A gas turbine engine can include a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Some aircraft include one or more flaps deployed during operation to orient the aircraft in a desired direction.

SUMMARY

An exhaust nozzle for a gas turbine engine according to an example of the present disclosure includes a duct having a first surface and a second surface extending about a duct axis to define an exhaust flow path, and at least one effector positioned along the first surface. The at least one effector is pivotable about an effector axis to vary a throat area of the exhaust flow path. The at least one effector tapers along the effector axis.

In a further embodiment of any of the forgoing embodiments, the at least one effector includes a first effector and a second effector pivotable about a common axis extending between the first effector and the second effector.

In a further embodiment of any of the forgoing embodiments, the first surface is stationary relative to the duct axis.

In a further embodiment of any of the forgoing embodiments, the second surface is movable relative to the duct axis.

In a further embodiment of any of the forgoing embodiments, the duct defines a recess extending from the first surface. The at least one effector includes a body extending between a first edge and a second edge each sloping inwardly towards the effector axis. The first edge is received in the recess and the second edge extends towards the second surface when the at least one effector is located in a first position. The second edge is received in the recess and the first edge extends towards the second surface when the at least one effector is located in a second, different position.

In a further embodiment of any of the forgoing embodiments, the throat area is defined at a first axial location relative to the duct axis when the at least one effector is located in the first position, and the throat area is defined at a second, different axial location relative to the duct axis when the at least one effector is located in the second position.

In a further embodiment of any of the forgoing embodiments, the first edge and the second edge are substantially flush with the first surface when the at least one effector is located in a third, different position.

In a further embodiment of any of the forgoing embodiments, surfaces of the body extending between the first edge and the second edge are substantially planar.

In a further embodiment of any of the forgoing embodiments, the body defines a ridge extending radially from the effector axis and sloping towards the duct axis.

In a further embodiment of any of the forgoing embodiments, the ridge is configured such that a distance between the ridge and the second surface differs in response to pivoting the at least one effector about the effector axis.

In a further embodiment of any of the forgoing embodiments, the effector axis is spaced apart from the first surface.

In a further embodiment of any of the forgoing embodiments, the effector axis extends longitudinally between opposed sidewalls of the at least one effector.

A gas turbine engine according to an example of the present disclosure includes a fan section coupled to a core engine, and a nacelle assembly mounted at least partially about the core engine. The nacelle assembly includes an exhaust nozzle coupled to the nacelle assembly. The exhaust nozzle includes a duct having a first surface and a second surface extending along a duct axis to define an exhaust flow path, and at least one effector having a body positioned in a recess along the first surface. The body extends between a leading edge and a trailing edge. The leading edge and the trailing edge are pivotable about an effector axis to vary a throat area of the exhaust flow path.

In a further embodiment of any of the forgoing embodiments, the core engine defines a core flow path, the fan section defines a bypass flow path, and the at least one effector is in fluid communication with at least one of the core flow path and the bypass flow path.

In a further embodiment of any of the forgoing embodiments, the effector axis extends longitudinally through the at least one effector, and the at least one effector tapers along the effector axis.

In a further embodiment of any of the forgoing embodiments, the at least one effector includes a first effector and a second effector pivotable about a common axis, and the first effector and the second effector both taper in a direction towards the duct axis.

A method of exhaust control for a gas turbine engine according to an example of the present disclosure includes positioning a first effector in an exhaust duct to define a first thrust vector angle, the first effector tapering along an effector axis, rotating the first effector in a first direction about the effector axis to cause the first thrust vector angle to increase, and rotating the first effector in a second, different direction about the effector axis to cause the first thrust vector angle to decrease.

In a further embodiment of any of the forgoing embodiments, the step of rotating the first effector in the first direction about the effector axis to cause the first thrust vector angle to increase includes locating a first edge of the first effector in a recess such that a second edge of the first effector extends into the exhaust duct, the first edge and the second edge extending between opposed sidewalls of the first effector, and the step of rotating the first effector in the second direction about the effector axis to cause the first thrust vector angle to decrease includes locating the second edge of the first effector in the recess such that the first edge extends into the exhaust duct.

A further embodiment of any of the forgoing embodiments includes positioning a second effector in the exhaust duct to define a second thrust vector, the second effector having a tapering cross-section at positions along the effector axis, and rotating the second effector about the effector axis independent of the first effector to cause the second thrust vector to vary.

A further embodiment of any of the foregoing embodiments includes rotating the first effector and the second effector in opposite directions about the effector axis such that each of the first effector and the second effector extends into the exhaust duct.

Although the different examples have the specific components shown in the illustrations, embodiments of this disclosure are not limited to those particular combinations. It is possible to use some of the components or features from one of the examples in combination with features or components from another one of the examples.

The various features and advantages of this invention will become apparent to those skilled in the art from the following detailed description of an embodiment. The drawings that accompany the detailed description can be briefly described as follows.

BRIEF DESCRIPTION OF THE DRAWINGS

FIG. 4A schematically shows a side view of an exhaust nozzle for the engine of FIG. 2.

FIG. 4B illustrates a plan view of the exhaust nozzle of FIG. 4A taken along line 4B-4B.

FIG. 5A illustrates a plan view of a control effector in a stowed position.

FIG. 5B illustrates a first axial view of the control effector of FIG. 5A.

FIG. 5C illustrates a second axial view of the control effector of FIG. 5A.

FIG. 5D illustrates a plan view of the control effector of FIG. 5A in a deployed position.

FIG. 5E illustrates a first axial view of the control effector of FIG. 5D.

FIG. 5F illustrates a second axial view of the control effector of FIG. 5D.

FIG. 5G illustrates a third axial view of the control effector of FIG. 5A in a deployed position.

FIG. 5H illustrates a plan view of two control effectors.

FIG. 5I illustrates a first axial view of the control effectors of FIG. 5H.

FIG. 5J illustrates a second axial view of the control effectors of FIG. 5H.

FIG. 5K illustrates a plan view of the control effectors of FIG. 5H in a stowed position.

FIG. 5L illustrates a plan view of the control effectors of FIG. 5H rotated in opposite directions.

FIG. 5M illustrates a plan view of the control effectors of FIG. 5H with one control effector in a deployed position.

FIG. 5N illustrates a plan view of the control effectors of FIG. 5H rotated in opposite directions.

FIG. 5O illustrates a plan view of the control effectors of FIG. 5H with one control effector in a deployed position.

DETAILED DESCRIPTION

Figure 1:
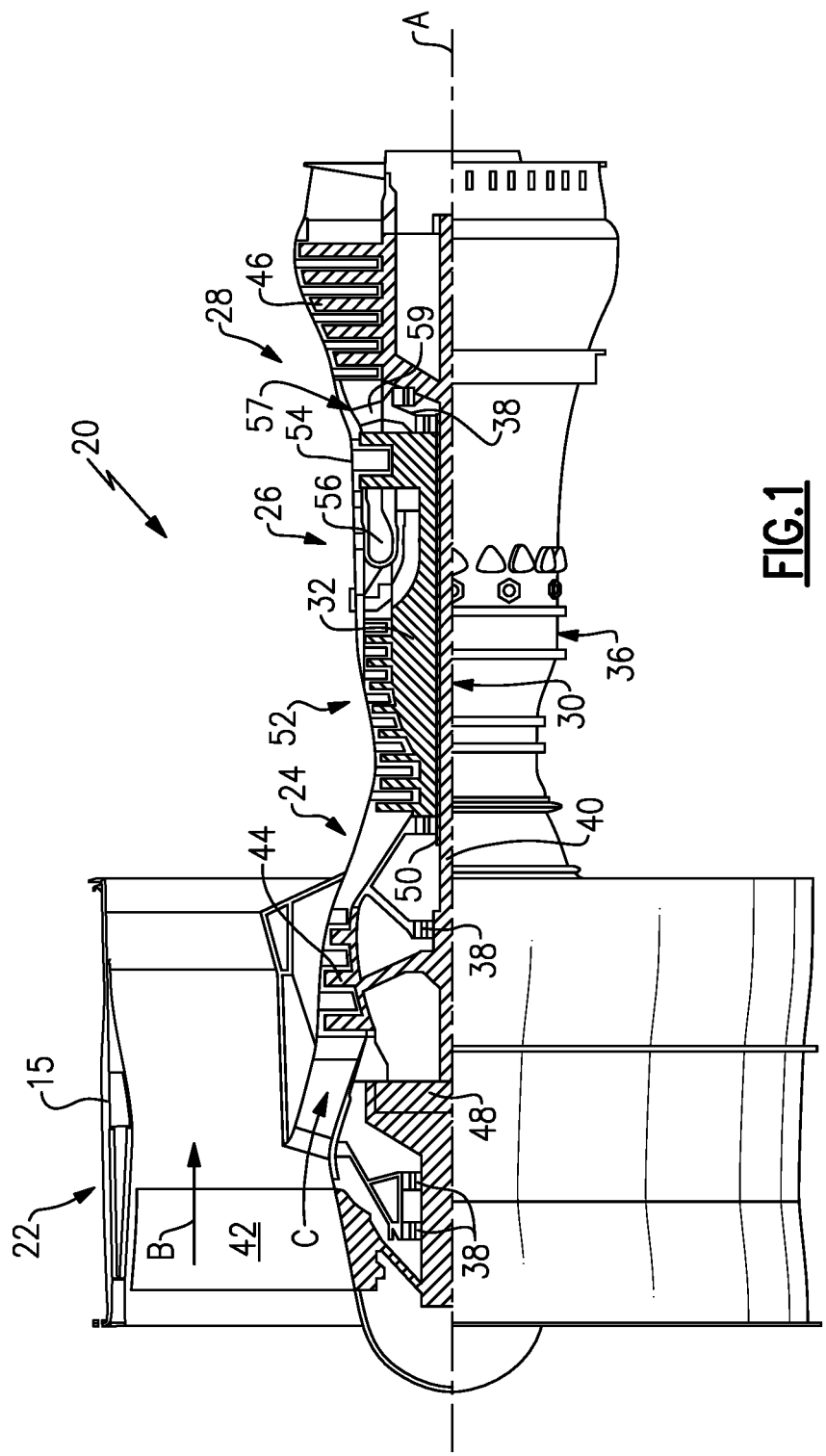
FIG. 1 schematically shows a gas turbine engine.

FIG. 1 schematically illustrates a gas turbine engine 20. In this disclosure, like reference numerals designate like elements where appropriate and reference numerals with the addition of one-hundred or multiples thereof designate modified elements that are understood to incorporate the same features and benefits of the corresponding original elements. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a fan nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a second (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a first (or high) pressure turbine 54. A combustor 56 is arranged in exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
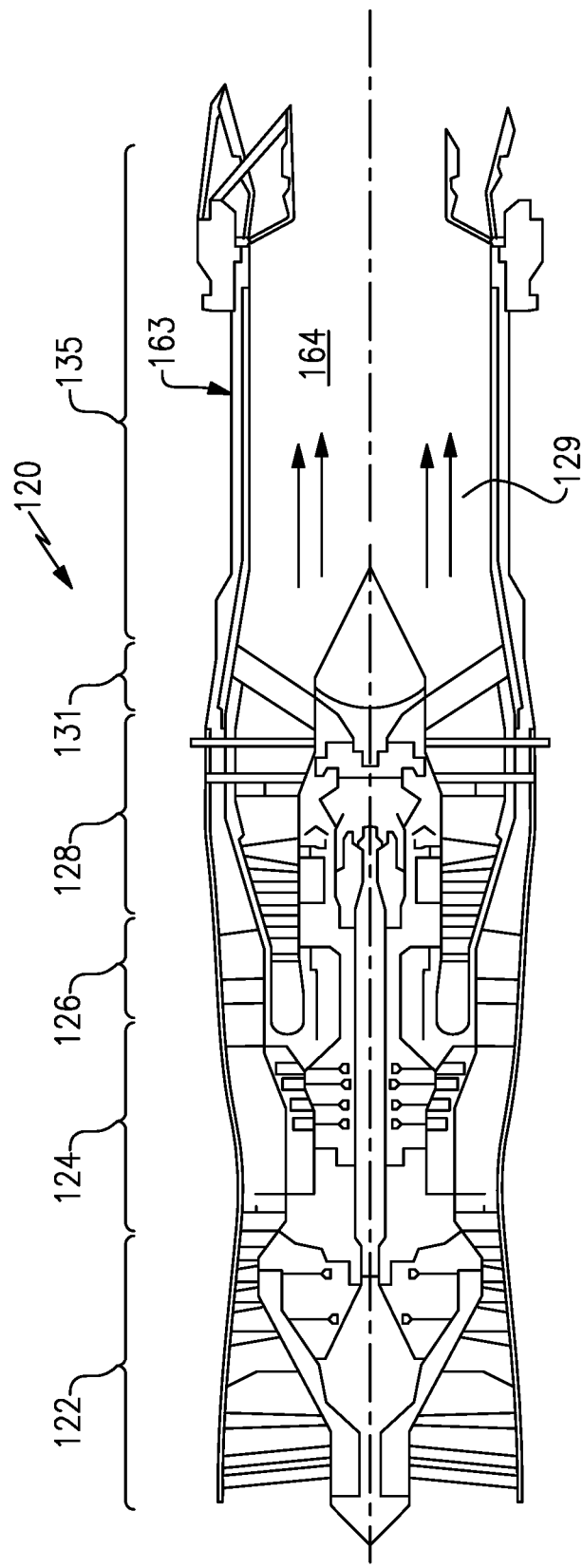
FIG. 2 schematically shows a gas turbine engine according to a second embodiment.

Referring to FIG. 2, a gas turbine engine 120 according to a second embodiment includes a fan section 122, a compressor section 124, a combustor section 126, and a turbine section 128. Air entering into the fan section 122 is initially compressed and the portion that is not bypassed along the bypass flow path B is fed to the compressor section 124. In the compressor section 124, the incoming air from the fan section 122 is further compressed and communicated to the combustor section 126. In the combustor section 126, the compressed air is mixed with gas and ignited to generate a hot exhaust stream 129. The hot exhaust stream 129 is expanded through the turbine section 128 to drive the fan section 122 and the compressor section 124. In this example, the gas turbine engine 120 includes an augmenter section 131 where additional fuel can be mixed with the exhaust gasses 129 and ignited to generate additional thrust. The exhaust gasses 129 flow from the turbine section 128 and the augmenter section 131 through an exhaust liner assembly 135.

Figure 3A:
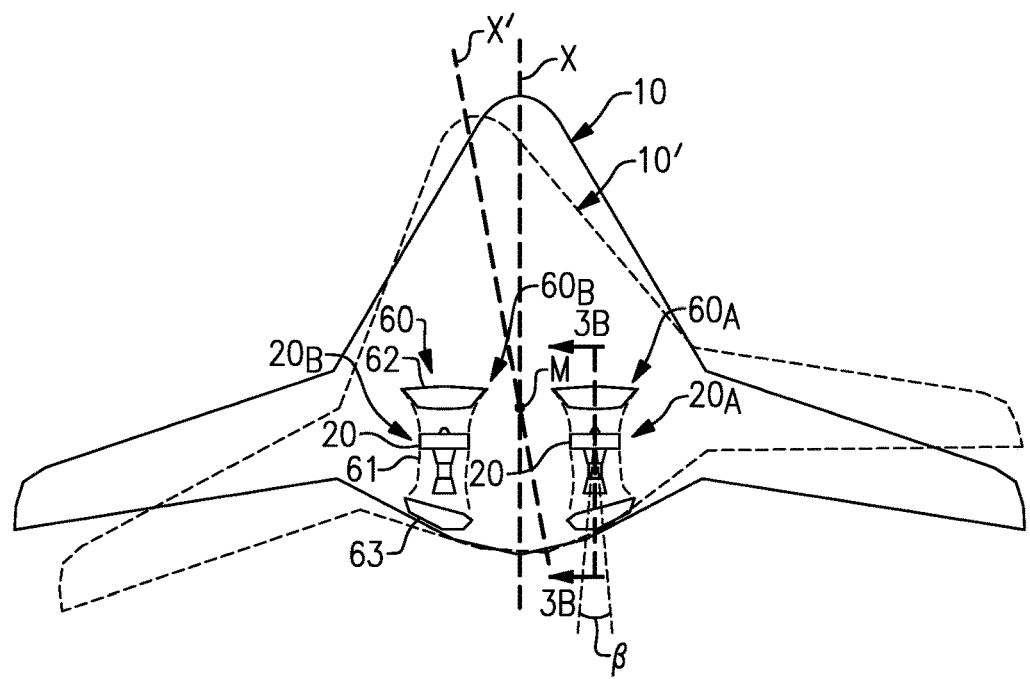
FIG. 3A schematically shows a notional aircraft planform including the location of an engine and a nacelle assembly for the engine of FIG. 1.

Referring to FIG. 3A, aircraft 10 is provided with a nacelle assembly 60. The aircraft 10 is depicted having a blended wing body extending along central axis X and is depicted as a twin engine aircraft having a pair of engines 20A, 20B. In the illustrated example, aircraft 10 is a rudderless aircraft with no vertical tail. It should be appreciated that the nacelle assembly 60 can be utilized with various single engine and multi-engine aircraft, such as commercial passenger, freighter, or transport aircraft. Additionally, rudder equipped aircraft or aircraft with different planforms can benefit from the teachings herein to provide redundancy or additional steering control.

The nacelle assembly 60 includes a duct 61 extending between an inlet 62 and an outlet or exhaust nozzle 63. In the illustrated example, the nacelle assembly 60 is mounted at least partially about engine 20A including the fan section 22 and a core engine including compressor section 24, combustor section 26 and turbine section 28 (FIG. 1). The inlet 62 is configured to deliver air to the engine 20. Exhaust gases, including the core airflow path C and the bypass flow path B (FIG. 3B), flow from the engine 20A to the exhaust nozzle 63. In the illustrated example, the aircraft 10 includes two engines 20A, 20B each arranged in a nacelle assembly 60A, 60B.

Figure 3B:
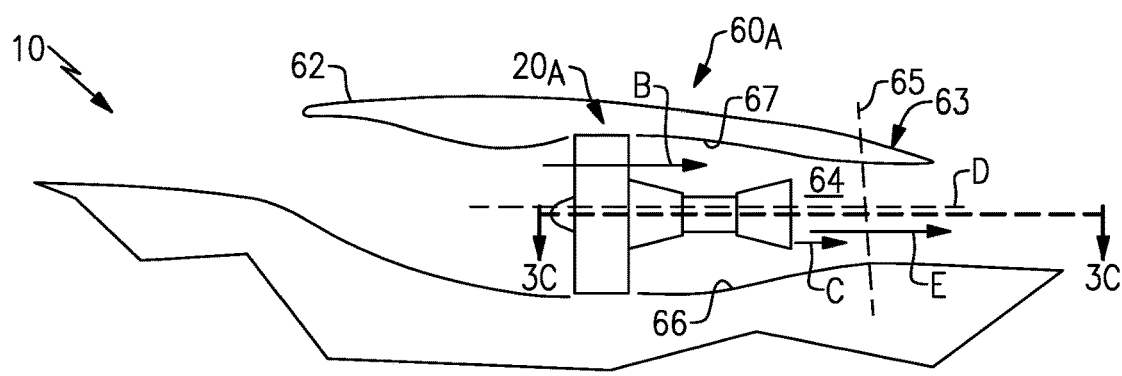
FIG. 3B illustrates a side view of the nacelle assembly of FIG. 3A taken along line 3B-3B.
Figure 3C:
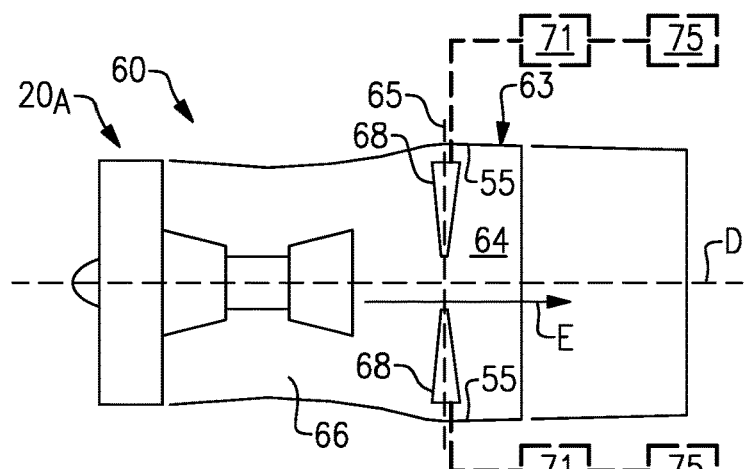
FIG. 3C illustrates a plan view of selected portions of the nacelle assembly of FIG. 3B taken along line 3C-3C.

Referring to FIGS. 3B and 3C, with continued reference to FIG. 3A, the exhaust nozzle 63 includes an exhaust duct 64 extending about a duct axis D to define an exhaust flow path E. The exhaust duct 64 includes a lower (or first) surface 66, an upper (or second) surface 67, and sidewalls 55 adjacent to lower and upper surfaces 66, 67 (FIG. 3C) of the exhaust duct 64 extending about the duct axis D. The exhaust duct 64 includes a flow area distribution that runs generally parallel to exhaust flowpath E converging to a prescribed minimal area that defines a throat area 65 extending along a plane between the lower surface 66, the upper surface 67, and sidewalls 55 of the exhaust duct 64. The throat area 65 is defined as a minimum jet area of the exhaust duct 64 relative to positions along the duct axis D. The teachings disclosed herein are applicable to a wide range of exhaust duct 64 shapes with various plane shapes of the nozzle throat area 65 such as rectangular, diamond, hexagon and "D" shaped profiles that contain at least one generally planar region for the installation of the control effectors 68 disclosed herein.

In some situations, an engine out condition occurs in which one of the engines 20A, 20B (FIG. 3A depicts engine 20B on the left as partially or totally inoperative) of aircraft 10 becomes inoperative or drops significantly in thrust output. Accordingly, the aircraft 10 may begin to pivot about a yaw axis M (perpendicular to the page) which may be at or near the aircraft center of gravity, as depicted by aircraft 10' of FIG. 3A (shown in phantom). In other situations, a rudder of a rudder equipped aircraft may become inoperative, thereby reducing yaw control the aircraft.

Referring to FIG. 3C, the exhaust nozzle 63 includes one or more control effectors 68 positioned along the lower surface 66. The one or more control effectors 68 are configured to selectively induce a desired amount of directional control the exhaust flow path E yaw control of the aircraft 10 by vectoring the thrust from engine 20A. Thrust vectoring of the exhaust flow from the remaining operative engine 20A can be controlled to reduce the yaw moment about axis M by having the force from the operating engine 20A pass closer to or through axis M of the aircraft 10, thereby reducing the need for other drag inducing devices to trim yaw. Although two control effectors 68 are depicted adjacent to the lower surface 66 for engine 20A in FIG. 3C, the teachings herein can be utilized with each engine 20A, 20B, and fewer or greater than two control effectors 68 at desired locations along the exhaust duct 64, such as upper (or second) surface 67 (FIG. 3B) to provide yaw control and/or sidewalls 55 (FIG. 3C) to provide pitch control of the aircraft 10 or an aircraft equipped with engine 120.

Each of the control effectors 68 is operable via a nozzle effector controller 75 coupled to an associated actuation system 71 to selectively cause a predetermined change in a vector of the exhaust flow path E, such as yaw thrust vector β (FIG. 3A) to provide yaw trimming by yaw thrust vectoring. The actuation system 71 is mechanically coupled to the control effector 68 and may be powered by pneumatic, hydraulic, electric or other means. The nozzle effector controller 75 can be located in either the airframe or engine architecture, for example. In some examples, the nozzle effector controller 75 is configured to control two or more actuation systems 71. In one example, nozzle effector controller 75 is incorporated in a full authority digital engine control (FADEC) for the entire engine. A worker of ordinary skill in the art would be able to design such a controller given the teachings of this disclosure. The yaw thrust vector β is defined relative to the exhaust flow path E immediately upstream of the control effector 68 (FIG. 1). Although thrust vectoring is primarily discussed with respect to a yaw direction, it should be appreciated that vectoring in other orientations relative to the aerodynamic plane of symmetry X of aircraft 10 are contemplated, such as vectoring in a pitch direction.

Referring to FIGS. 4A and 4B, an exhaust nozzle 163 for the engine 120 of FIG. 2 is shown. In some examples, the exhaust nozzle 163 is a variable area convergent-divergent exhaust nozzle configured to change a geometry of exhaust duct 164 and flow characteristics of exhaust flow path E. In the illustrated example of FIG. 4A, the exhaust nozzle 163 is a single expansion ramp nozzle (SERN) having a fixed (or first) surface 166 stationary relative to the duct axis D and having a variable (or second) surface 167 moveable relative to the duct axis D. The variable surface 167 includes one or more convergent flaps 169 and one or more divergent flaps 170 moveable relative to the duct axis D. The flaps 169, 170 are movable to positions 169', 170' (shown in dashed lines) to vary a throat area 165 of the exhaust duct 164. One or more control effectors 168 are positioned adjacent to a lower surface 166 of the exhaust duct 164. The control effectors 168 can be operated independently of the flaps 169, 170, or can be synchronized to provide a desired geometry of throat area 165.

FIGS. 5A to 5F illustrate a control effector 268 according to a first embodiment. The control effector 268 can be utilized with one of the exhaust nozzles 63, 163, for example. FIGS. 5A to 5C illustrate the control effector 268 in a stowed position. The control effector 268 can be rotated or otherwise pivoted in different directions about an effector axis 278 to affect the yaw thrust vector β (FIG. 5D) in a desired direction. FIGS. 5D to 5F illustrate the control effector 268 pivoted about the effector axis 278 in a first deployed position to affect yaw thrust vector β in a first direction relative to the exhaust flow path E. The control effector 268 can be pivoted about the effector axis 278 in a second deployed position to affect yaw thrust vector β in a second, different direction relative to the exhaust flow path E (FIG. 5G). The control effector 268 is pivotable about the effector axis 278 to vary a throat area of the exhaust flow path E. The control effector 268 is coupled to at least one actuation system 271 configured to cause the control effector 268 to pivot or rotate about the effector axis 278.

In the illustrated example of FIGS. 5A to 5F, the control effector 268 includes a generally truncated conical body 272 extending along the effector axis 278 between a leading (or first) edge 274 and a trailing (or second) edge 276. Although the leading and trailing edges 274, 276 are depicted as being substantially straight, or geometries can be utilized such as a contoured profile having one or more arcuate segments. The effector axis 278 extends longitudinally between opposed first and second sidewalls 281, 282. The effector axis 278 is arranged substantially in a reference plane defined by the throat area 265 when the control effector 268 is located in the stowed position. In alternative examples, the effector axis 278 is offset from the throat area 265 when in the stowed position.

The leading and trailing edges 274, 276 slope inwardly from the first sidewall 281 to a second sidewall 282 such that the generally conical body 272 of the effector 268 tapers along the effector axis 278. Accordingly, a projection of each of the leading and trailing edges 274, 276 is transverse to the effector axis 278.

Exhaust duct 264 defines a recess 280 extending from the lower surface 266. The recess 280 is configured to at least partially receive the effector 268. The effector axis 278 is spaced apart from lower surface 266 such that portions of the body 272 such as leading and trailing edges 274, 276 of the control effector 268 pivot in the recess 280. Although the control effector 268 is depicted as being adjacent to lower surface 266, one or more control effectors 268 can be positioned along other surfaces of the exhaust duct 264 to provide the desired thrust vectoring.

In the illustrated example of FIGS. 5A to 5F, flow surfaces 273 of the body 272 between the leading and trailing edges 274, 276 are substantially planar with the exhaust duct 264 when the control effector 268 is in a stowed (or first) position, thereby defining a substantially continuous surface with adjacent surfaces of the exhaust duct 264 and reducing drag in the exhaust flow path E. The flow surfaces 273 are bounded by leading and trailing edges 274, 276 and opposed sidewalls 281, 282 to define a trapezoidal geometry. In the illustrated example of FIGS. 5A to 5F, the flow surfaces 273 define an isosceles trapezoidal geometry to provide the desired drag in the exhaust flow path E. Other geometries of the flow surfaces 273 can be utilized, such as a curved or radiused leading edge 274, trailing edge 276 and/or opposed sidewalls 281, 282 adjacent to the flow surfaces 273.

In the illustrated example of FIGS. 5A to 5C, the leading and trailing edges 274, 276 are substantially flush with the lower surface 266 when the control effector 268 is located in the stowed position such that the throat area 265 extends between the upper surface 267 at position $P_1$ (FIG. 5C) and a position along the flow surfaces 273 between the leading and trailing edges 274, 276. In the illustrated example of FIGS. 5D to 5F, the leading edge 274 is received in the recess 280 and the trailing edge 276 extends towards the upper surface 267 (FIG. 5D) when the control effector 268 is located in a first deployed (or second) position such that the throat area 265' is defined downstream of the effector axis 278 relative to the exhaust flow path E. The control effector 268 is arranged such that a location of the throat area 265 changes along surfaces of the control effector 268 in response to rotation of the effector 268 about the effector axis 278.

In alternative examples, the trailing edge 276 is received in the recess 280 and the leading edge 274 extends towards the upper surface 267 when the control effector 268 is located in a second deployed (or third) position such that the throat area 265" is defined along the leading edge 274 upstream of the effector axis 278 relative to the exhaust flow path E and along upper surface 267 at position $P_2$, as illustrated in FIG. 5G. Accordingly, the throat area is defined at a first axial position 265 when the control effector 268 is located in the stowed position (FIG. 5A), is defined at a second axial position 265' (FIG. 5D) when the control effector 268 is located in the first deployed position, and is defined at a third axial position 265" (FIG. 5G) when the control effector 268 is located in the second deployed position relative to the exhaust flow path E.

FIGS. 5H to 5J illustrate two independently controlled and actuated control effectors 268A, 268B positioned along the lower surface 266. The control effectors 268A, 268B can be independently controlled to deliver a requested vector magnitude for yaw thrust vectors $\beta_A$ and/or $\beta_B$, for example. The effector axis 278A, 278B of control effectors 268A, 268B are arranged along a common axis 279 transverse to the duct axis D. Sidewalls 281A, 281B of the control effectors 268A, 268B are arranged adjacent to the duct axis D such that both of the leading edges 274A, 274B and both of the trailing edges 276A, 276B slope inwardly from the first sidewalls 281A, 281B to the second sidewalls 282A, 282B.

In the illustrated example of FIGS. 5H to 5J, the control effector 268A is pivoted about the common axis 279 in a first direction $d_1$ (FIG. 5I) to define yaw thrust vector $\beta_A$, and control effector 268B is pivoted about the common axis 279 in a second, different direction $d_2$ (FIG. 5J) to define yaw thrust vector $\beta_B$. The control effectors 268A, 268B can be independently rotated about the common axis 279 to cause the respective yaw thrust vectors $\beta_A$, $\beta_B$ to change. In the illustrated example, the control effectors 268A, 268B are rotated in opposite directions about the common axis 279 such that portions of each of the control effectors 268A, 268B extend into the exhaust duct 264. In further examples, the control effectors 268A, 268B can be pivoted a predetermined distance in asymmetric or opposite directions $d_1$, $d_2$ about the common axis 279 such that the yaw thrust vectors $\beta_A$, $\beta_B$ are substantially equal. In another example, control effector 268A is pivoted in direction $d_2$ and control effector 268B is pivoted in direction $d_1$ to define yaw thrust vectors $\beta_A'$, $\beta_B'$ (FIG. 5H). Asymmetric rotation of the control effectors 268A, 268B causes the throat area 265A, 265B to skew relative to the duct axis D, as shown in FIG. 5H.

Referring to FIGS. 5K to 5O, with continued reference to FIGS. 5H to 5J, the control effectors 268A, 268B can be independently pivoted about corresponding effector axes 278A, 278B or common axis 279 to define the throat area 265 relative to the exhaust duct 264 and affect a combined yaw thrust vector $\beta$ and corresponding exhaust flow path E in a desired direction and/or magnitude. In FIG. 5K, the control effectors 268A, 268B are located in the stowed position. In FIG. 5L, control effector 268A is pivoted in the first direction $d_1$ (FIG. 5I), and control effector 268B is pivoted in the second direction $d_2$ (FIG. 5J). In FIG. 5M, control effector 268A is pivoted in the first direction $d_1$ and control effector 268B is located in a stowed position such that a magnitude of the yaw thrust vector $\beta$ is relatively less than the yaw thrust vector $\beta$ of FIG. 5L. In FIG. 5N, control effector 268A is pivoted in the second direction $d_2$, and control effector 268B is pivoted in the first direction $d_1$. In FIG. 5O, control effector 268B is pivoted in the first direction $d_1$ and control effector 268A is located in a stowed position such that a magnitude of the yaw thrust vector $\beta$ is relatively less than the yaw thrust vector $\beta$ of FIG. 5N.

As illustrated by control effectors 268A, 268B of FIGS. 5L and 5M, rotating at least one of the control effectors 268A, 268B in a first direction about the respective effector axis 278A, 278B causes an angle of the thrust vector $\beta$ to increase (e.g., effector 268A of FIG. 5L). As illustrated by control effectors 268A, 268B of FIGS. 5N and 5O, rotating at least one of the control effectors 268A, 268B in a second direction about the respective effector axis 278A, 278B causes an angle of the thrust vector $\beta$ to decrease. The positioning of control effectors 268A, 268B depicted in FIGS. 5L and 5N provide relatively greater thrust vectoring than the positioning of control effectors 268A, 268B depicted in FIGS. 5M and 5O. Each of the control effectors 268A, 268B can be configured to rotate in a predefined range of motion about the respective effector axes 278A, 278B to provide the desired thrust vectoring control. The predefined range may be equal to or less than 360 degrees of rotation.

The control effectors 268A, 268B can be rotated in the same or different directions about the respective effector axes 278A, 278B. In some examples, the control effectors 268A, 268B are rotated in the same direction about the respective effector axes 278A, 278B (e.g., thrust vectors $\beta_A'$ and $\beta_B$ in FIG. 5H) to provide for relatively fine modulation of flow through the exhaust flow path E. Rotation of the control effectors 268A, 268B can be utilized to provide yaw (or pitch) control during an engine out condition. In alternative examples, the control effectors 268A, 268B can be utilized to provide normal trim of aircraft 10, 110, thereby reducing aerodynamic drag caused by deployment of one or more flaps such as a rudder, or can be utilized to provide redundancy for situations in which one or more flaps become inoperative.

FIGS. 6A to 6F illustrate a control effector 368 according to a second embodiment. The control effector 368 can be utilized with one of the exhaust nozzles 63, 163, for example. The control effector 368 includes a ridge 384 extending radially from an effector axis 378. The ridge 384 is defined between sidewalls 381, 382 and along a reference plane defined by the effector axis 378 such that the ridge 384 slopes towards duct axis D. The ridge 384 is configured such that a distance between the ridge 384 and an upper (or second) surface 367 (FIG. 6C) differs in response to pivoting the control effector 368 about the effector axis 378.

Figure 6B:
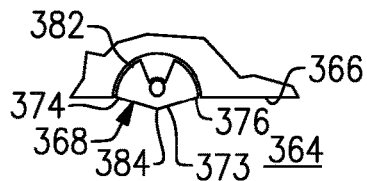
FIG. 6B illustrates a first axial view of the control effector of FIG. 6A.
Figure 6E:
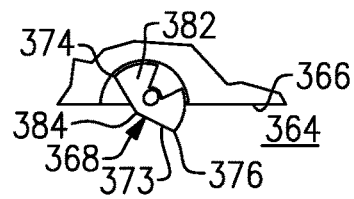
FIG. 6E illustrates a first axial view of the control effector of FIG. 6D.
Figure 6A:
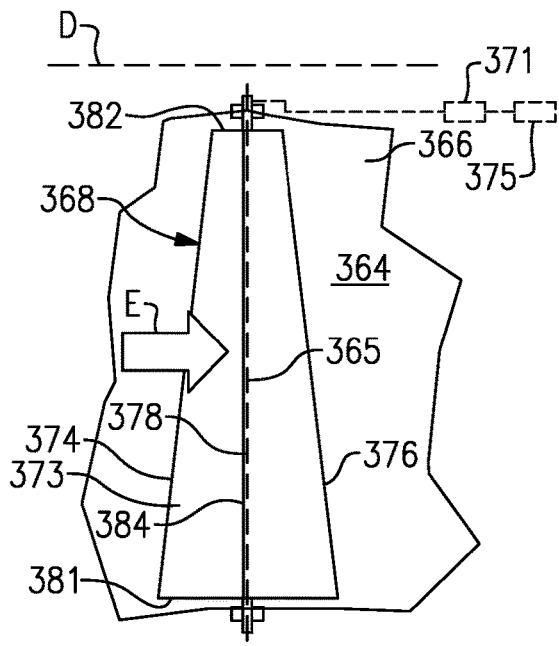
FIG. 6A illustrates a plan view of a control effector in a stowed position, according to a second embodiment.
Figure 6D:
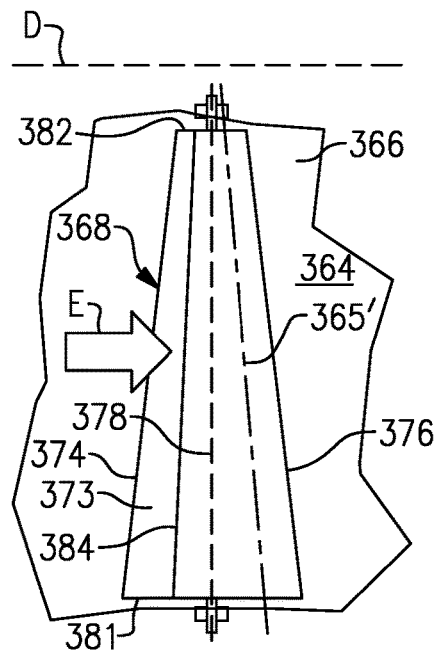
FIG. 6D illustrates a plan view of the control effector of FIG. 6A in a deployed position.
Figure 6C:
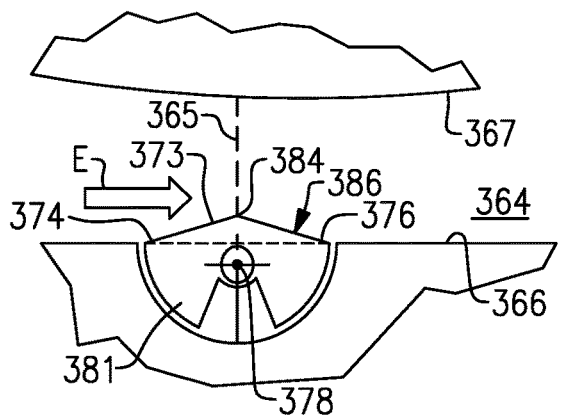
FIG. 6C illustrates a second axial view of the control effector of FIG. 6A.
Figure 6F:
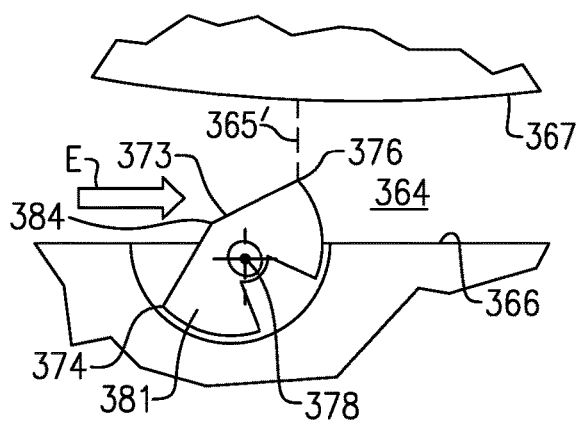
FIG. 6F illustrates a second axial view of the control effector of FIG. 6D.
Figure 6G:
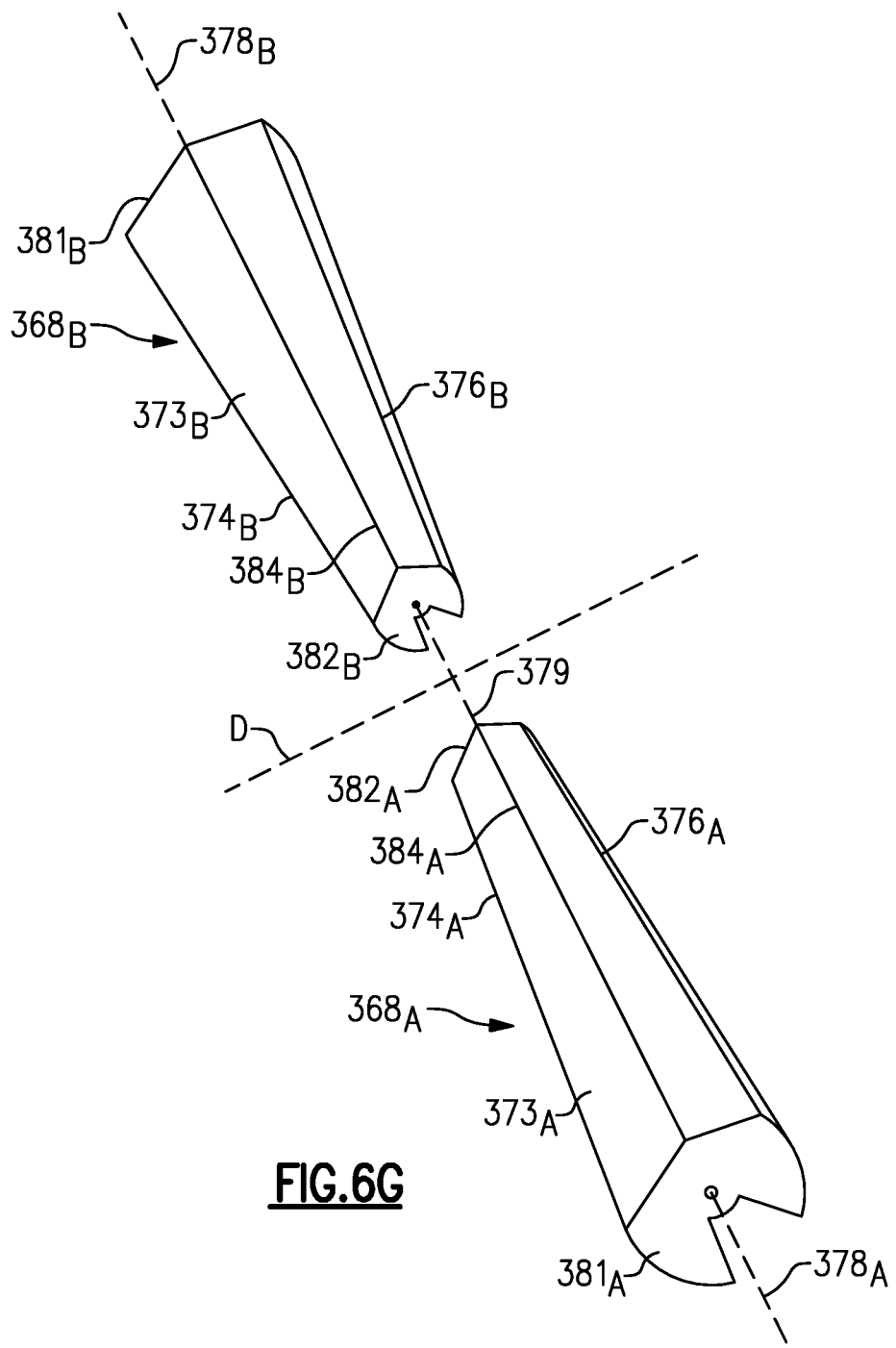
FIG. 6G illustrates a perspective view of two control effectors, according to the second embodiment.

The geometry of the ridge 384 assists in defining the throat area 365 when the control effector 368 is in the stowed position (throat area shown at 365' in FIG. 6D corresponding to a deployed position of the control effector 368). Although ridge 384 is depicted as a single inflection point between leading and trailing edges 374, 376 along flow surfaces 373 of the control effector 368, it should be appreciated that other geometries can be utilized, such as an arcuate or curved cross-sectional profile relative to the exhaust flow path E. In some examples, two control effectors 368 are positioned along a common axis 379 transverse to duct axis D, as illustrated by control effectors 368A, 368B in FIG. 6G.

Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An exhaust nozzle for a gas turbine engine, comprising:
a duct having a first surface and a second opposing surface extending along a duct axis to define an exhaust flow path; and
wherein the duct defines a recess extending from the first surface;
at least one effector positioned in the recess across the first surface, the at least one effector includes a body extending axially along an effector axis between a first effector-sidewall and an opposing second effector-sidewall and extending transversely between an effector leading edge and an effector trailing edge with respect to the effector axis, the effector leading and trailing edge extending axially from the first effector-sidewall to the second effector-sidewall, the effector leading edge forward of the effector trailing edge with respect to the duct axis, the at least one effector pivotable about the effector axis to vary a throat area of the exhaust flow path, wherein at least one of the effector leading edge and the effector trailing edge tapers inwardly from the first effector-sidewall to the second effector-sidewall with respect to a distance from the effector axis; and
wherein at least one of the effector leading edge and the effector trailing edge is pivotable away from the recess and into the exhaust flow path.

2. The exhaust nozzle as recited in claim 1, wherein the first surface is stationary relative to the duct axis, and the second surface is movable relative to the duct axis.

3. The exhaust nozzle as recited in claim 2, wherein the at least one effector includes a first effector and a second effector pivotable about a common axis that extends along the respective effector axis of the first effector and the second effector.

4. The exhaust nozzle as recited in claim 1, wherein:
each of the effector leading edge and effector trailing edge tapers inwardly from the first effector-sidewall to the second effector-sidewall with respect to the effector axis such that a first distance between the leading and trailing edges at the first effector-sidewall differs from a second distance between the leading and trailing edges at the second effector-sidewall;
the effector leading edge is received in the recess and the effector-trailing edge extends towards the second surface when the at least one effector is positioned in a first position; and
the effector trailing edge is received in the recess and the effector leading edge extends towards the second surface when the at least one effector is positioned in a second position.

5. The exhaust nozzle as recited in claim 4, wherein the effector leading edge and the effector trailing edge are substantially flush with the first surface when the at least one effector is located in a third position.

6. The exhaust nozzle as recited in claim 4, wherein the throat area is defined at a first axial location relative to the duct axis when the at least one effector is located in the first position, and the throat area is defined at a second, different axial location relative to the duct axis when the at least one effector is located in the second position.

7. The exhaust nozzle as recited in claim 6, wherein the throat area is defined by the effector trailing edge at the first axial location, the throat area is defined by the effector leading edge at the second axial location, the body includes a first face and a second face joined at a ridge to bound the exhaust flow path, the ridge extending radially outward with respect to the effector axis and into the exhaust flow path, with the first face sloping from the ridge toward the effector leading edge and the second face sloping from the ridge toward the effector trailing edge, and each of the effector leading and effector trailing edge and said ridge sloping from the first effector-sidewall toward the second effector-sidewall with respect to the effector axis.

8. The exhaust nozzle as recited in claim 1, wherein the body defines a ridge extending radially from the effector axis and sloping towards the duct axis such that a distance between the ridge and the second surface differs in response to pivoting the at least one effector about the effector axis, and the effector axis is spaced apart from the first surface.

9. An exhaust nozzle for a gas turbine engine, comprising:
a duct having a first surface and a second opposing surface extending along a duct axis to define an exhaust flow path;
wherein the duct defines a recess extending from the first surface;
at least one effector positioned across the first surface, the at least one effector includes a body extending along an effector axis between a first effector-sidewall and an opposing second effector-sidewall and extending between an effector leading edge and an effector trailing edge with respect to the duct axis, the at least one effector pivotable about the effector axis to vary a throat area of the exhaust flow path, wherein the at least one effector having a tapering cross-section at positions along at least one of the effector leading edge and the effector railing edge with respect to the effector axis;
wherein at least one of the effector leading edge and the effector trailing edge is pivotable away from the recess and into the exhaust flow path;
wherein each of the effector leading edge and effector trailing edge slopes inwardly from the first effector-sidewall to the second effector-sidewall with respect to the effector axis;
wherein the effector leading edge is received in the recess and the effector-trailing edge extends towards the second surface when the at least one effector is positioned in a first position; and
wherein the effector trailing edge is received in the recess and the effector leading edge extends towards the second surface when the at least one effector is positioned in a second position;
wherein the throat area is defined at a first axial location relative to the duct axis when the at least one effector is located in the first position, and the throat area is defined at a second, differential axial location relative to the duct axis when the at least one effector is located in the second position; and
wherein the throat area is defined by the effector trailing edge at the first axial location, the throat area is defined by the effector leading edge at the second axial location, the body includes a first face and a second face joined at a ridge to bound the exhaust flow path, the ridge extending radially outward with respect to the effector axis and into the exhaust flow path, with the first face sloping from the ridge toward the effector leading edge and the second face sloping from the ridge toward the effector trailing edge, and each of the effector leading and effector trailing edge and said ridge sloping from the first effector-sidewall toward the second effector-sidewall with respect to the effector axis.

10. The exhaust nozzle as recited in claim 7, wherein the first surface is stationary relative to the duct axis, and the second surface is movable relative to the duct axis.

11. The exhaust nozzle as recited in claim 7, wherein the at least one effector includes a first effector and a second effector pivotable about a common axis that extends along the respective effector axis of the first effector and the second effector.

12. A gas turbine engine, comprising:
a nacelle assembly including an exhaust nozzle coupled to the nacelle assembly, the exhaust nozzle comprising:
a duct having a first surface and a second opposing surface extending along a duct axis to define an exhaust flow path;
at least one effector having a body positioned in a recess across the first surface, the body extending axially along an effector axis between a first effector-sidewall and an opposing second effector-sidewall and extending transversely between an effector leading edge and an effector trailing edge with respect to the effector axis, the effector leading and trailing edges extending axially from the first effector-sidewall to the second effector-sidewall, the effector leading edge forward of the effector trailing edge with respect to the duct axis, the effector axis extending longitudinally through the at least one effector, the effector leading edge and the effector trailing edge pivotable about the effector axis to vary a throat area of the exhaust flow path, at least one of the effector leading edge and the effector trailing edge of the at least one effector tapering inwardly from the first effector-sidewall to the second effector-sidewall with respect to a distance from the effector axis; and
wherein the at least one of the effector leading edge and the effector trailing edge is pivotable away from the recess and into the exhaust flow path.

13. The gas turbine engine as recited in claim 12, wherein the nacelle assembly is mounted at least partially about a core engine, the nacelle assembly further comprising a fan section coupled to the core engine, wherein the core engine defines a core flow path, the fan section defines a bypass flow path, and the at least one effector is in fluid communication with at least one of the core flow path and the bypass flow path.

14. The gas turbine engine as recited in claim 13, wherein the first surface is stationary relative to the duct axis, and the second surface is movable relative to the duct axis.

15. The gas turbine engine as recited in claim 12, wherein the at least one effector includes a first effector and a second effector.

16. The gas turbine engine as recited in claim 15, wherein the effector axis of the first effector aligned with the effector axis of the second effector such that the first effector and the second effector are pivotable about a common axis.

17. The gas turbine engine as recited in claim 15, wherein each of the effector leading edge and the effector trailing edge of the respective first effector and second effector taper in a direction towards the duct axis.

18. The gas turbine engine as recited in claim 17, wherein:
each of the effector leading edge and effector trailing edge slopes inwardly from the first effector-sidewall to the second effector-sidewall with respect to the distance from the effector axis such that a first distance between the leading and trailing edges at the first effector-sidewall differs from a second distance between the leading and trailing edges at the second effector-sidewall;
the effector leading edge is received in the recess and the effector-trailing edge extends towards the second surface when the at least one effector is positioned in a first position; and
the effector trailing edge is received in the recess and the effector leading edge extends towards the second surface when the at least one effector is positioned in a second position.

19. The gas turbine engine as recited in claim 18, wherein the throat area is defined at a first axial location relative to the duct axis when the at least one effector is located in the first position, and the throat area is defined at a second, different axial location relative to the duct axis when the at least one effector is located in the second position.

20. The gas turbine engine as recited in claim 18, wherein:
the effector leading edge and the effector trailing edge are substantially flush with the first surface when the at least one effector is located in a third position; and
the body includes a first face and a second face joined at a ridge to bound the exhaust flow path, the ridge extending radially outward with respect to the effector axis and into the exhaust flow path, with the first face sloping from the ridge toward the effector leading edge and the second face sloping from the ridge toward the effector trailing edge, and each of the effector leading and effector trailing edge and said ridge progressively tapers from the first effector-sidewall toward the second effector-sidewall with respect to the effector axis.

21. The gas turbine engine as recited in claim 19, wherein the throat area is defined by the effector trailing edge at the first axial location, and the throat area is defined by the effector leading edge at the second axial location.

22. The gas turbine engine as recited in claim 21, wherein the effector axis of the first effector aligned with the effector axis of the second effector such that the first effector and the second effector are pivotable about a common axis.

* * * * *